US012027092B2

(12) United States Patent
Xi

(10) Patent No.: US 12,027,092 B2
(45) Date of Patent: Jul. 2, 2024

(54) ADJUSTING METHOD OF DISPLAY PANEL AND ADJUSTING DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Yue Xi, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/600,538

(22) PCT Filed: Jul. 21, 2021

(86) PCT No.: PCT/CN2021/107581
§ 371 (c)(1),
(2) Date: Sep. 30, 2021

(87) PCT Pub. No.: WO2022/262064
PCT Pub. Date: Dec. 22, 2022

(65) Prior Publication Data
US 2024/0029617 A1 Jan. 25, 2024

(30) Foreign Application Priority Data
Jun. 17, 2021 (CN) ......................... 202110671863.1

(51) Int. Cl.
*G09G 3/00* (2006.01)
*G09G 3/20* (2006.01)
*H01L 27/02* (2006.01)

(52) U.S. Cl.
CPC ....... *G09G 3/2014* (2013.01); *G09G 2310/08* (2013.01); *G09G 2320/0209* (2013.01);
(Continued)

(58) Field of Classification Search
CPC ............. G09G 3/2014; G09G 2310/08; G09G 2320/0209; G09G 2320/0233;
(Continued)

(56) References Cited

U.S. PATENT DOCUMENTS

2017/0243548 A1 8/2017 Wang et al.
2018/0075801 A1* 3/2018 Le ........................ G09G 3/3233
(Continued)

FOREIGN PATENT DOCUMENTS

CN 107516495 A 12/2017
CN 108335677 A 7/2018
(Continued)

OTHER PUBLICATIONS

Chinese Office Action issued in corresponding Chinese Patent Application No. 202110671863.1 dated Jan. 18, 2022, pp. 1-8.
(Continued)

*Primary Examiner* — Andrew Sasinowski
(74) *Attorney, Agent, or Firm* — PV IP PC; Wei Te Chung; Zhigang Ma

(57) ABSTRACT

An adjusting method of a display panel and an adjusting device are provided. The adjusting method of the display panel includes following steps: obtaining a minimum refresh rate and a maximum refresh rate of the display panel; calculating a standard parameter value of the display panel according to the minimum refresh rate and the maximum refresh rate; judging if the standard parameter value satisfies a preset condition; and increasing a pixel charging time under the minimum refresh rate and/or reducing the pixel charging time under the maximum refresh rate when the
(Continued)

standard parameter value does not satisfy the preset condition.

20 Claims, 11 Drawing Sheets

(52) U.S. Cl.
CPC ............... *G09G 2320/0233* (2013.01); *G09G 2320/0626* (2013.01); *G09G 2340/0435* (2013.01); *G09G 2360/16* (2013.01)

(58) Field of Classification Search
CPC ... G09G 2320/0626; G09G 2340/0435; G09G 2360/16; G09G 5/393; G09G 5/10
See application file for complete search history.

(56) References Cited

U.S. PATENT DOCUMENTS

| | | | | |
|---|---|---|---|---|
| 2019/0311680 | A1* | 10/2019 | Koo | G06F 3/14 |
| 2020/0111412 | A1* | 4/2020 | Hou | G09G 3/3225 |
| 2021/0116988 | A1* | 4/2021 | Nidamanuri | G06F 1/3218 |
| 2022/0223104 | A1* | 7/2022 | Sun | G09G 3/3208 |
| 2022/0327977 | A1* | 10/2022 | Sliech | G09G 3/20 |

FOREIGN PATENT DOCUMENTS

| | | | |
|---|---|---|---|
| CN | 110675824 | A | 1/2020 |
| CN | 110751933 | A | 2/2020 |
| CN | 111540331 | A | 8/2020 |
| CN | 111640390 | A | 9/2020 |
| CN | 111816133 | A | 10/2020 |
| CN | 111883038 | A | 11/2020 |
| CN | 112133239 | A | 12/2020 |
| CN | 112365839 | A | 2/2021 |
| CN | 112419959 | A | 2/2021 |
| CN | 112530351 | A | 3/2021 |
| CN | 112767867 | A | 5/2021 |
| CN | 112927658 | A | 6/2021 |

OTHER PUBLICATIONS

International Search Report in International application No. PCT/CN2021/107581, dated Feb. 25, 2022.
Written Opinion of the International Searching Authority in International application No. PCT/CN2021/107581, dated Feb. 25, 2022.

* cited by examiner

ADJUSTING METHOD OF DISPLAY PANEL AND ADJUSTING DEVICE

RELATED APPLICATIONS

This application is a Notional Phase of PCT Patent Application No. PCT/CN2021/107581 having international filing date Jul. 21, 2021, which claims the benefit of priority of Chinese Patent Application No. 202110671863.1 filed on Jun. 17, 2021. The contents of the above applications are all incorporated by reference as if fully set forth herein in their entirety.

FIELD OF INVENTION

The present disclosure relates to the field of display technologies, and more particularly, to an adjusting method of a display panel and an adjusting device.

BACKGROUND OF INVENTION

Frame synchronization (FreeSync) technology is a technology used in display industries to solve problems such as screen freezes and error frames by dynamically adjusting refresh rates of display devices. FreeSync technology allows the display devices to communicate with graphics cards, thereby allowing the display devices to dynamically change their refresh rates and to synchronize with a current frame generated by graphics processing units (GPUs), so it can ensure that no new frames are formed during refresh periods, thereby preventing screen images from tearing. At a same time, since the refresh rates are synchronized with rates of forming new frames, FreeSync technology will not cause screen freezes.

The industries mainly measure a change ratio (the following is represented by FreeSync) of display brightness to a refresh rate when the display devices change their frequencies to judge if the display devices comply with a FreeSync standard. Usually, it is judged that the display devices comply with the FreeSync standard when change ratios of the display brightness to the refresh rate under a maximum refresh rate and a minimum refresh rate are less than or equal to a default value. When a brightness difference of the display devices between the maximum refresh rate and the minimum refresh rate is overly large, the change ratios of the display brightness to the refresh rate under the maximum refresh rate and the minimum refresh rate may exceed the default value, and the display devices are judged not to comply with the FreeSync standard.

Technical problem: in view of this, an objective of the present disclosure is to provide an adjusting method of a display panel and an adjusting device to solve a technical problem of a brightness difference of display devices between a maximum refresh rate and a minimum refresh rate being large caused by electrical leakage of the display devices.

SUMMARY OF INVENTION

The present disclosure provides the adjusting method of the display panel, which includes following steps:

obtaining a minimum refresh rate and a maximum refresh rate of the display panel;

calculating a standard parameter value of the display panel according to the minimum refresh rate and the maximum refresh rate;

judging if the standard parameter value satisfies a preset condition; and increasing a pixel charging time under the minimum refresh rate and/or reducing the pixel charging time under the maximum refresh rate when the standard parameter value does not satisfy the preset condition.

In an embodiment, the step of calculating the standard parameter value according to the minimum refresh rate and the maximum refresh rate includes following steps:

obtaining a first brightness value according to the minimum refresh rate;

obtaining a second brightness value according to the maximum refresh rate; and calculating the standard parameter value according to the minimum refresh rate, the first brightness value, the maximum refresh rate, and the second brightness value.

In an embodiment, the step of calculating the standard parameter value according to the minimum refresh rate and the maximum refresh rate includes following steps:

subtracting the first brightness value from the second brightness value to obtain a first target parameter;

subtracting the minimum refresh rate from the maximum refresh rate to obtain a second target parameter; and dividing the first target parameter by the second target parameter to obtain the standard parameter value.

In an embodiment, before the step of calculating the standard parameter value of the display panel according to the minimum refresh rate and the maximum refresh rate, the adjusting method further includes following steps:

adjusting a display grayscale of the display panel to be a grayscale of 127; and adjusting the display grayscale of the display panel to be a grayscale of 255;

the step of calculating the standard parameter value of the display panel according to the minimum refresh rate and the maximum refresh rate includes following steps:

calculating the standard parameter value under the grayscale of 127; and calculating the standard parameter value under the grayscale of 255.

In an embodiment, the step of judging if the standard parameter value satisfies the preset condition includes:

if the standard parameter value under the grayscale of 127 is less than or equal to 0.04 and the standard parameter value under the grayscale of 255 is less than or equal to 0.03, judging the standard parameter value satisfies the preset condition, and if no, judging the standard parameter value does not satisfy the preset condition.

In an embodiment, 6. the step of increasing the pixel charging time under the minimum refresh rate and/or reducing the pixel charging time under the maximum refresh rate when the standard parameter value does not satisfy the preset condition includes:

obtaining a clock signal, and increasing a pulse width of the clock signal under the minimum refresh rate and/or reducing the pulse width of the clock signal under the maximum refresh rate according to the clock signal.

In an embodiment, the step of increasing the pixel charging time under the minimum refresh rate and/or reducing the pixel charging time under the maximum refresh rate when the standard parameter value does not satisfy the preset condition includes:

obtaining a data signal, and bringing forward a pulse start time of the data signal under the minimum refresh rate and/or delaying the pulse start time of the data signal under the maximum refresh rate according to the data signal.

In an embodiment, the step of obtaining the data signal, and bringing forward the pulse start time of the data signal under the minimum refresh rate and/or delaying the pulse start time of the data signal under the maximum refresh rate according to the data signal includes:

obtaining a data control signal, and reducing a pulse width of the data control signal under the minimum refresh rate and/or increasing the pulse width of the data control signal under the maximum refresh rate according to the data control signal.

In an embodiment, the step of obtaining the data signal, and bringing forward the pulse start time of the data signal under the minimum refresh rate and/or delaying the pulse start time of the data signal under the maximum refresh rate according to the data signal includes:

obtaining a data control signal and bringing forward a pulse start time of the data control signal under the minimum refresh rate according to the data control signal, and/or obtaining the data control signal and delaying the pulse start time of the data control signal under the maximum refresh rate according to the data control signal.

In an embodiment, after the step of increasing the pixel charging time under the minimum refresh rate and/or reducing the pixel charging time under the maximum refresh rate when the standard parameter value does not satisfy the preset condition, the adjusting method further includes:

obtaining a standard display parameter after adjusting;

judging if the standard display parameter is within a preset range; and adjusting the pixel charging time under the minimum refresh rate and the pixel charging time under the maximum refresh rate when the standard display parameter is not within the preset range.

The present disclosure further provides the adjusting device of the display panel, which includes:

an obtaining module configured to obtain a minimum refresh rate and a maximum refresh rate of the display panel;

a calculating module configured to calculate a standard parameter value of the display panel according to the minimum refresh rate and the maximum refresh rate;

a judging module configured to judge if the standard parameter value satisfies a preset condition; and an adjusting module configured to increase a pixel charging time under the minimum refresh rate and/or reduce the pixel charging time under the maximum refresh rate when the standard parameter value does not satisfy the preset condition.

In an embodiment, the obtaining module is further configured to obtain a first brightness value according to the minimum refresh rate and obtain a second brightness value according to the maximum refresh rate.

In an embodiment, the obtaining module is further configured to obtain a standard display parameter after adjusting.

In an embodiment, the calculating module is configured to subtract the first brightness value from the second brightness value to obtain a first target parameter, subtract the minimum refresh rate from the maximum refresh rate to obtain a second target parameter, and divide the first target parameter by the second target parameter to obtain the standard parameter value.

In an embodiment, the calculating module is configured to calculate the standard parameter value under the grayscale of 127 and the grayscale of 255.

In an embodiment, the judging module is configured to judge the standard parameter value satisfies the preset condition if the standard parameter value under the grayscale of 127 is less than or equal to 0.04 and the standard parameter value under the grayscale of 255 is less than or equal to 0.03, and if no, judge the standard parameter value does not satisfy the preset condition.

In an embodiment, the obtaining module is further configured to obtain a standard display parameter after adjusting, and the judging module is further configured to judge if the standard display parameter is within a preset range.

In an embodiment, the adjusting module is configured to adjust the pixel charging time under the minimum refresh rate and/or the pixel charging time under the maximum refresh rate when the standard parameter value does not satisfy the preset condition to allow the standard parameter value to satisfy the preset condition.

In an embodiment, the adjusting module is configured to execute one or more of following functions:

obtaining a clock signal, and increasing a pulse width of the clock signal under the minimum refresh rate and/or reducing the pulse width of the clock signal under the maximum refresh rate according to the clock signal;

obtaining a data signal, and bringing forward a pulse start time of the data signal under the minimum refresh rate and/or delaying the pulse start time of the data signal under the maximum refresh rate according to the data signal;

obtaining a data control signal, and reducing a pulse width of the data control signal under the minimum refresh rate and/or increasing the pulse width of the data control signal under the maximum refresh rate according to the data control signal; and obtaining the data control signal and bringing forward a pulse start time of the data control signal under the minimum refresh rate according to the data control signal, and/or obtaining the data control signal and delaying the pulse start time of the data control signal under the maximum refresh rate according to the data control signal.

In an embodiment, the adjusting module is further configured to adjust the pixel charging time under the minimum refresh rate and the pixel charging time under the maximum refresh rate when a standard display parameter is not within a preset range.

Beneficial effect: by increasing the pixel charging time under the minimum refresh rate and/or reducing the pixel charging time under the maximum refresh rate, the adjusting method of the display panel and the adjusting device can allow a brightness under the minimum refresh rate to be higher than a brightness under the maximum refresh rate in a display period, so a brightness difference between the minimum refresh rate and the maximum refresh rate caused by electrical leakage in a non-display period can be offset. Therefore, the standard parameter value can be reduced, thereby allowing the standard parameter value to be as close to a standard as possible.

DESCRIPTION OF DRAWINGS

The accompanying figures to be used in the description of embodiments of the present disclosure will be described in brief to more clearly illustrate the technical solutions of the embodiments. Obviously, the accompanying figures described below are only part of the embodiments of the present disclosure, from which those skilled in the art can derive further figures without making any inventive efforts.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all embodiments. Based on the embodiments in the present disclosure, all other embodiments obtained by those skilled in the art without creative efforts are within the scope of the present disclosure.

The present disclosure provides an adjusting method of a display panel. The display panel in the embodiments of the present disclosure may be applied to mobile phones, tablet computers, desktop computers, laptop computers, e-readers, handheld computers, electronic display screens, notebook computers, ultra-mobile personal computers (UMPCs), netbooks, cellular phones, personal digital assistants (PDAs), augmented reality (AR)/virtual reality (VR) devices, media players, wearable devices, digital cameras, car navigation systems, etc.

The display panel may be a liquid crystal display panel. A type of the liquid crystal display panel is not limited in the present disclosure. The liquid crystal display panel provided in the present disclosure may be a horizontal electric field type liquid crystal display panel, such as a fringe field switching (FFS) type liquid crystal display panel or an in-plane switching (IPS) type liquid crystal display panel, or may be a vertical electric field type liquid crystal display panel, such as a twisted nematic (TN) type liquid crystal display panel or a multi-domain vertical alignment (MVA) type liquid crystal display panel.

The adjusting method of the display panel of the present disclosure will be described below in conjunction with the accompanying drawings.

Figure 1:
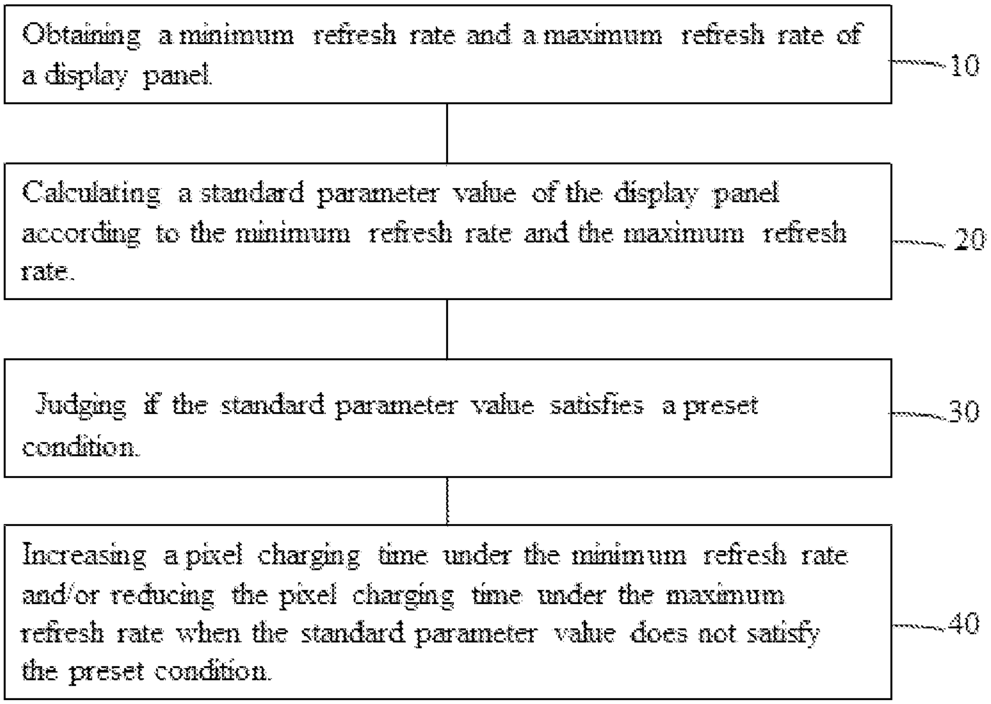
FIG. 1 is a flowchart of an adjusting method of a display panel according to an embodiment of the present disclosure.

Referring to FIG. 1, FIG. 1 is a flowchart of the adjusting method of the display panel according to an embodiment of the present disclosure. The adjusting method of the display panel provided by the present disclosure includes following steps.

Step 10: obtaining a minimum refresh rate and a maximum refresh rate of the display panel.

In the step 10, the maximum refresh rate of the display panel is a highest working frequency of the display panel, and the minimum refresh rate of the display panel is a lowest working frequency of the display panel. The display panel can work in a variable frequency ranging from the minimum refresh rate to the maximum refresh rate. For example, the minimum refresh rate of the display panel may be 60 Hz, and the maximum refresh rate of the display panel may be 75 Hz, 120 Hz, or 144 Hz. The minimum refresh rate and the maximum refresh rate of the display panel can be stored in a memory in advance or can be obtained by testing.

Step 20: calculating a standard parameter value of the display panel according to the minimum refresh rate and the maximum refresh rate.

In an embodiment, in the step 20, the standard parameter value may be a parameter value used to determine if display devices comply with FreeSync standard established by AMD company.

Specifically, the step 20 may include following steps.

Step 21: obtaining a first brightness value according to the minimum refresh rate.

In the step 21, the first brightness value is a brightness value under the minimum refresh rate. Specifically, the brightness value under the minimum refresh rate may be measured in a certain range of grayscales. For example, the brightness value under the minimum refresh rate may be measured one by one in a range of grayscales from 0 to 255.

Step 22: obtaining a second brightness value according to the maximum refresh rate.

In the step 22, the second brightness value is a brightness value under the maximum refresh rate. Specifically, the brightness value under the maximum refresh rate may be measured in the certain range of grayscales. For example, the brightness value under the maximum refresh rate may be measured one by one in the range of grayscales from 0 to 255.

Step 23: calculating the standard parameter value according to the minimum refresh rate, the first brightness value, the maximum refresh rate, and the second brightness value.

In the step 23, a calculation method of the standard parameter value is subtracting the first brightness value from the second brightness value to obtain a first target parameter, subtracting the minimum refresh rate from the maximum refresh rate to obtain a second target parameter, and dividing the first target parameter by the second target parameter to obtain the standard parameter value.

In the following, FreeSync means the standard parameter value, Fmax means the maximum refresh rate, Fmin means the minimum refresh rate, $L_{Fmax}$ means the brightness value under the maximum refresh rate, and $L_{Fmin}$ means the brightness value under the minimum refresh rate. A calculation formula of FreeSync is:

$FreeSync=(L_{Fmax}-L_{Fmin})/(Fmax-Fmin)$. Step 30: judging if the standard parameter value satisfies a preset condition.

In an embodiment, when the FreeSync standard is adopted, the display devices are determined to satisfy the FreeSync standard if a value of FreeSync satisfies following conditions at a same time, and if no, the display devices are determined not to satisfy the FreeSync standard:

under a grayscale of 127 (L127), FreeSync≤0.04, and under a grayscale of 255 (L255), FreeSync≤0.03.

That is, FreeSync>0.04 when under L127 or FreeSync>0.03 when under L255, the display devices are not satisfy the FreeSync standard.

In this embodiment, the preset condition in the step 30 is that the standard parameter value under the grayscale of 127 is less than or equal to 0.04 and the standard parameter value under the grayscale of 255 is less than or equal to 0.03. If the standard parameter value under the grayscale of 127 is less than or equal to 0.04 and the standard parameter value under the grayscale of 255 is less than or equal to 0.03, the standard parameter value is judged to satisfy the preset condition, and if no, the standard parameter value is judged not to satisfy the preset condition. Specifically, when the standard parameter value under the grayscale of 127 is greater than 0.04 and/or the standard parameter value under the grayscale of 255 is greater than 0.03, the standard parameter value is judged not to satisfy the preset condition.

It can be understood that standards used in frame synchronization are not limited in the present disclosure, and the adjusting method of the present disclosure may also be used to obtain technical effects when the standards that are used are different.

Step 40: increasing a pixel charging time under the minimum refresh rate and/or reducing the pixel charging time under the maximum refresh rate when the standard parameter value does not satisfy the preset condition.

In the step 40, when the standard parameter value is judged not to satisfy the preset condition, the standard parameter value may satisfy the preset condition by adjusting the pixel charging time under the minimum refresh rate and/or the pixel charging time under the maximum refresh rate. When the adjustment is finished, it may go back to steps 20 and 30 again until the standard parameter value meets the preset condition. Specifically, the step of adjusting the pixel charging time under the minimum refresh rate and/or the pixel charging time under the maximum refresh rate is adjusting the pixel charging time under the minimum refresh rate and/or the pixel charging time under the maximum refresh rate.

Figure 2:
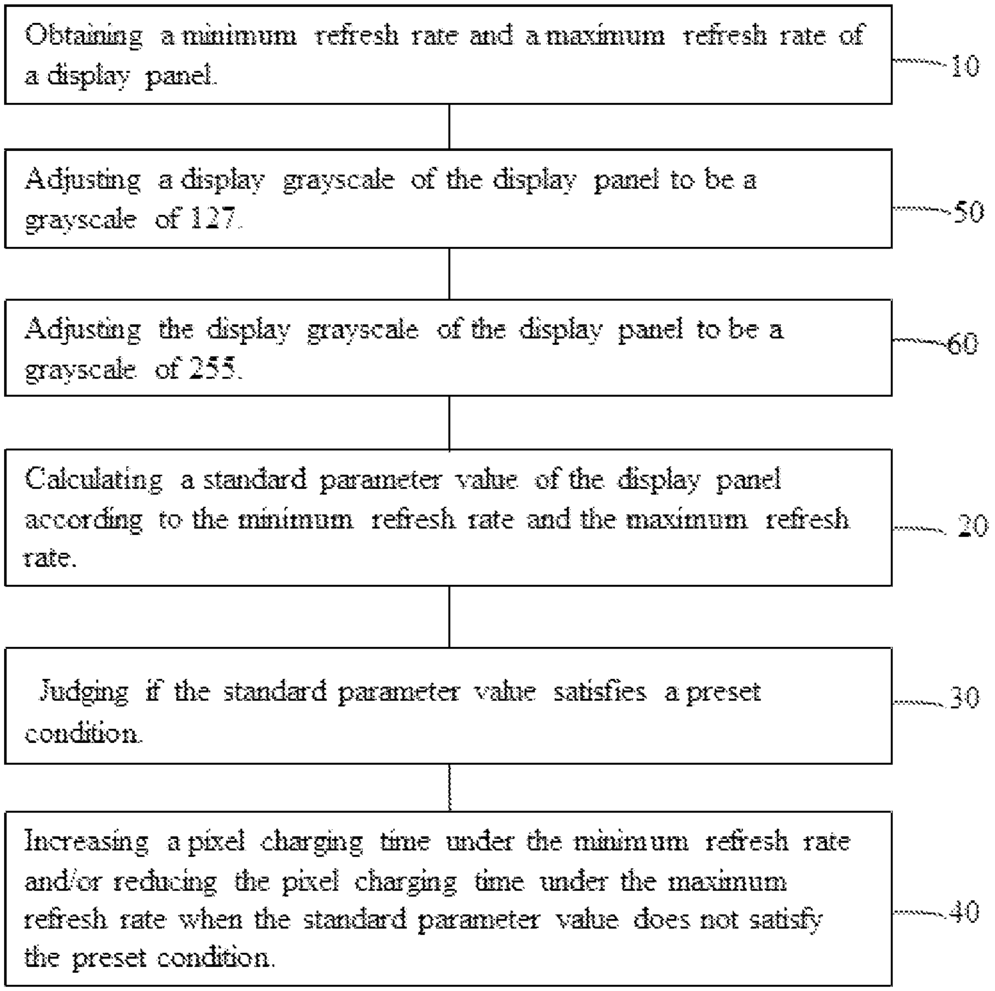
FIG. 2 is a flowchart of the adjusting method of the display panel according to another embodiment of the present disclosure.

Referring to FIG. 2, FIG. 2 is a flowchart of the adjusting method of the display panel according to another embodiment of the present disclosure. In this embodiment, before the step 20 of calculating the standard parameter value of the display panel according to the minimum refresh rate and the maximum refresh rate, the method further includes following steps.

Step 50: adjusting a display grayscale of the display panel to be the grayscale of 127.

In the step 50, since the standard parameter value of a current FreeSync standard is tested under the grayscale of 127, the standard parameter value of the display panel is calculated under the grayscale of 127 by having the display panel display the grayscale of 127, and then is judged and adjusted.

Step 60: adjusting the display grayscale of the display panel to be the grayscale of 255.

In the step 60, since the standard parameter value of the current FreeSync standard is tested under the grayscale of 255, the standard parameter value of the display panel is calculated under the grayscale of 255 by having the display panel display the grayscale of 255, and then is judged and adjusted.

It can be understood that when the standard parameter value of another FreeSync standard is tested under another grayscale, the standard parameter value of the display panel may be calculated, judged, and adjusted under the another grayscale by having the display panel display the another grayscale.

The step 20 of calculating the standard parameter value of the display panel according to the minimum refresh rate and the maximum refresh rate includes the following steps.

Step 31: calculating the standard parameter value under the grayscale of 127.

Step 32: calculating the standard parameter value under the grayscale of 255.

Hereinafter, an adjustment solution of the pixel charging time of the present disclosure in the step 40 will be described in detail in conjunction with a driving sequence of the display panel.

Figure 3:
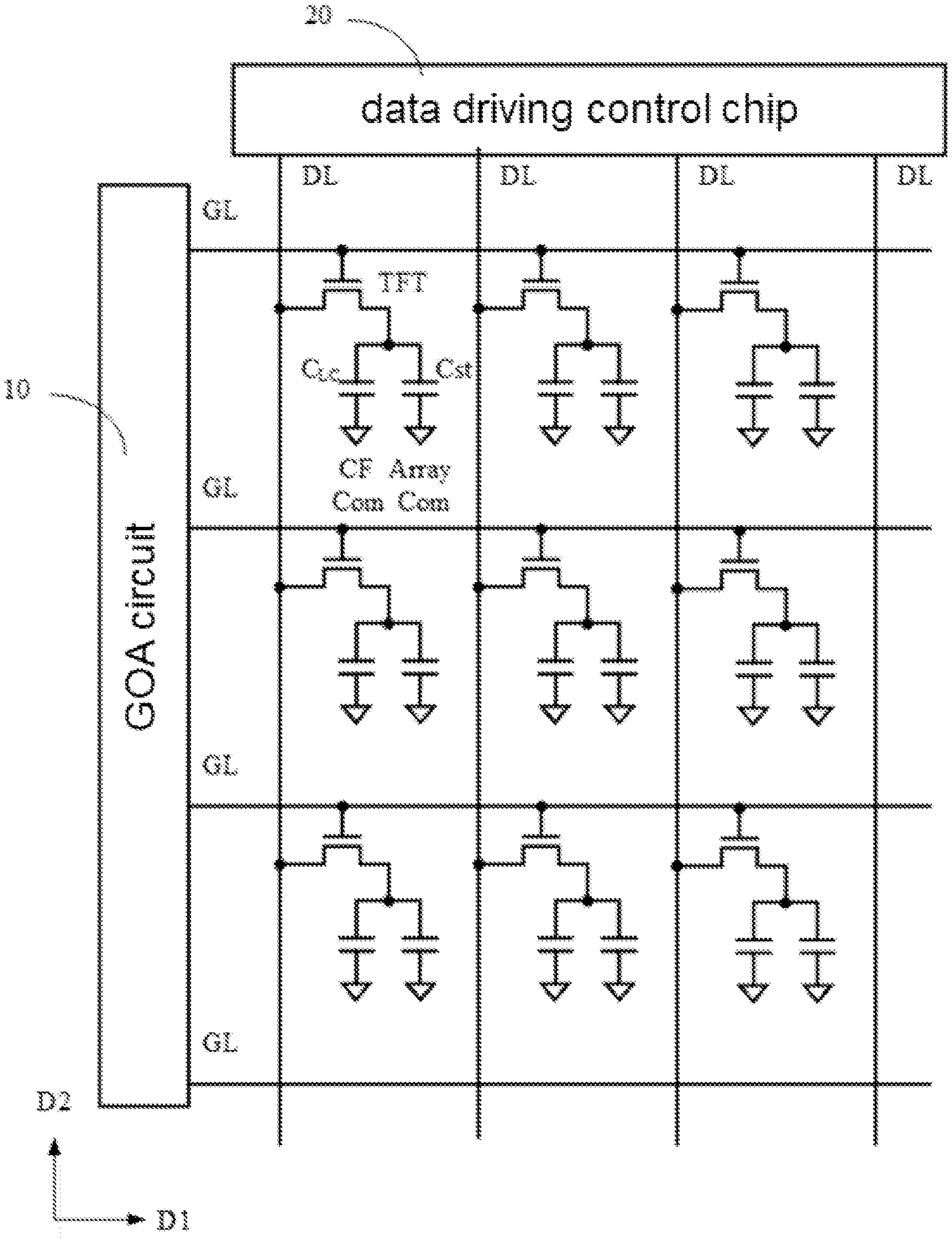
FIG. 3 is an equivalent circuit diagram of the display panel according to an embodiment of the present disclosure.

Referring to FIG. 3, FIG. 3 is an equivalent circuit diagram of the display panel according to an embodiment of the present disclosure. The display panel may be the liquid crystal display panel. The liquid crystal display panel has a display area and a bezel area. The bezel area is provided with a gate driver on array (GOA) circuit 10. The GOA circuit 10 is obtained by directly manufacturing a row driving circuit on an array substrate. A data driving control chip 20 is also bonded in the bezel area. In some embodiments, a row driving scan chip can also replace the GOA circuit 10. The GOA circuit 10 and the data driving control chip 20 provide driving signals to the display panel.

The display panel includes the array substrate, a color filter substrate, and a liquid crystal layer. The array substrate is disposed opposite to the color filter substrate. The liquid crystal layer is disposed between the array substrate and the color filter substrate. The array substrate includes a plurality of scanning lines GL and a plurality of data lines SL. The scanning lines GL extend along a first direction D1. The data lines SL extend along a second direction D2 that is perpendicular to the first direction D1. The first direction D1 may be a row direction, the second direction D2 may be a column direction, and the scanning lines GL and the data lines SL intersect to form a plurality of pixels. Each of the pixels includes a thin film transistor, a liquid crystal capacitor $C_{LC}$, and a storage capacitor $C_{ST}$. The thin film transistor includes a gate electrode, a source electrode, and a drain electrode. Gate electrodes of thin film transistors in a same row are connected to a same scanning line GL. The thin film transistors of the present disclosure being N-type transistors are taken as an example, wherein, the thin film transistors are turned on when gate electrodes thereof are at a high level and are turned off when the gate electrodes thereof are at a low level. Source electrodes of the thin film transistors in a same column are connected to a same data line SL. Drain electrodes of the thin film transistors are electrically connected to liquid crystal capacitors $C_{LC}$ and storage capacitors $C_{ST}$. The drain electrodes are electrically connected to pixel electrodes corresponding to first electrodes of the liquid crystal capacitors $C_{LC}$. The storage capacitors $C_{ST}$ are defined by common electrodes on an array substrate side and the pixel electrodes. The color filter substrate includes a color filter and common electrodes on a color filter substrate side. The color filter corresponds to the pixel electrodes of the array substrate. The common electrodes on the color filter substrate side correspond to second electrodes of the liquid crystal capacitors $C_{LC}$.

The GOA circuit 10 is electrically connected to the scanning lines GL and selectively activates the scanning lines GL in sequence. The GOA circuit 10 provides a clock signal to one of the scanning lines GL, thereby turning on the thin film transistors in a corresponding row. At this time, a corresponding data signal Data is input into a corresponding data line SL to charge the liquid crystal capacitors and the storage capacitors to a suitable voltage, thereby displaying a row of pictures.

Figure 4A:
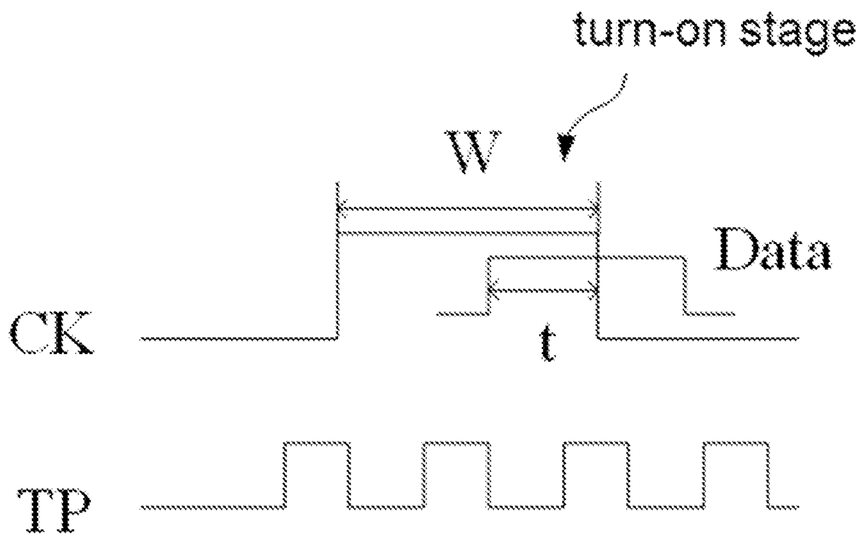
FIG. 4(*a*) is a driving timing diagram of the display panel before adjusting according to a first embodiment of the present disclosure, FIG. 4(*b*) is a driving timing diagram of the display panel after adjusting under a minimum refresh rate according to the first embodiment of the present disclosure, and FIG. 4(*c*) is a driving timing diagram of the display panel after adjusting under a maximum refresh rate according to the first embodiment of the present disclosure.
Figure 4B:
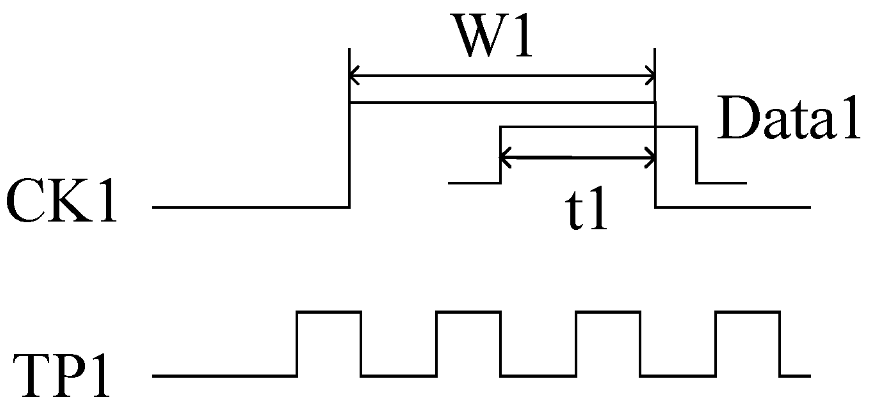
Figure 4C:
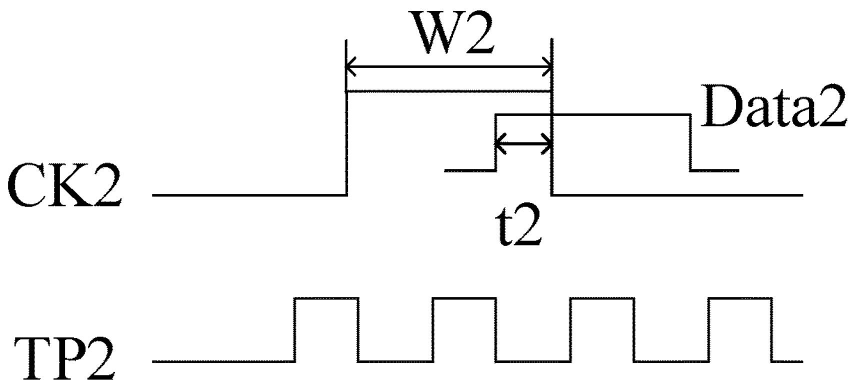

Referring to FIG. 4(*a*), FIG. 4(*a*) is a driving timing diagram of the display panel before adjusting according to a first embodiment of the present disclosure. In an original state before adjusting, driving timing diagrams of the minimum refresh rate and the maximum refresh rate are same. The clock signal CK is a signal that is provided to the scanning lines GL by the GOA circuit 10 and is configured to control output of a scanning signal. The display panel is further connected to a timer control register (TCON). The TCON sends a data control signal TP to control the data driving control chip 20 to output data signals Data. The data control signal TP is a continuous pulse, and each of the data signals Data output by the control of each pulse of the data control signal TP corresponds to one row of the scanning lines SL. In the present disclosure, a second pulse of the data control signal TP corresponds to a row of the scanning lines SL in a turn-on stage of the clock signal CK.

The data signals Data are signals that are provided to the source electrodes of the thin film transistors by the data lines SL and charge the pixels by the thin film transistors. The clock signal CK includes the turn-on stage, and the clock signal CK is at a high level in the turn-on stage and is at a low level in a remaining time period. The data control signal TP includes a plurality of alternating high levels and low levels. In the turn-on stage of the clock signal CK, the data control signal TP is at the low level first, then is pulled up to the high level, and then drops to the low level. At a rising edge of the data control signal TP, the data lines SL output the data signals Data, and at this time, the data signals Data are at the low level; while at a falling edge of the data control signal TP, the data signals Data are pulled up to the high level. A rising edge of the data signals Data, that is, a time period from the falling edge of the data control signal TP to a falling edge of the clock signal CK, is the pixel charging time of charging the pixels. It can be understood that waveforms of the clock signal CK, the data control signal TP, and the data signals Data are not limited in the embodiments of the present disclosure. In this embodiment, the clock signal CK, the data control signal TP, and the data signals Data are square wave signals.

From the above, it can be known that the pixel charging time t may be determined by the clock signal CK and the data signals Data, and the data signals Data may be determined by the data control signal TP.

Referring to FIGS. 4(*a*) and 4(*b*), FIG. 4(*b*) is a driving timing diagram of the display panel after adjusting under the minimum refresh rate according to the first embodiment of the present disclosure. In an embodiment, the step of increasing the pixel charging time under the minimum refresh rate includes: obtaining a clock signal, and increasing a pulse width of the clock signal under the minimum refresh rate according to the clock signal. Referring to FIGS. 4(*a*) and 4(*c*), FIG. 4(*c*) is a driving timing diagram of the display panel after adjusting under the maximum refresh rate according to the first embodiment of the present disclosure. The step of reducing the pixel charging time under the maximum refresh rate includes: obtaining the clock signal, and reducing the pulse width of the clock signal under the maximum refresh rate according to the clock signal.

In order to illustrate the effect of the present disclosure, an adjusted signal under the minimum refresh rate is distinguished by "first", and another adjusted signal under the maximum refresh rate is distinguished by "second". For example, a first clock signal CK1 represents an adjusted clock signal under the minimum refresh rate, and a second pixel charging time t2 represents an adjusted pixel charging time under the maximum refresh rate.

Figure 5:
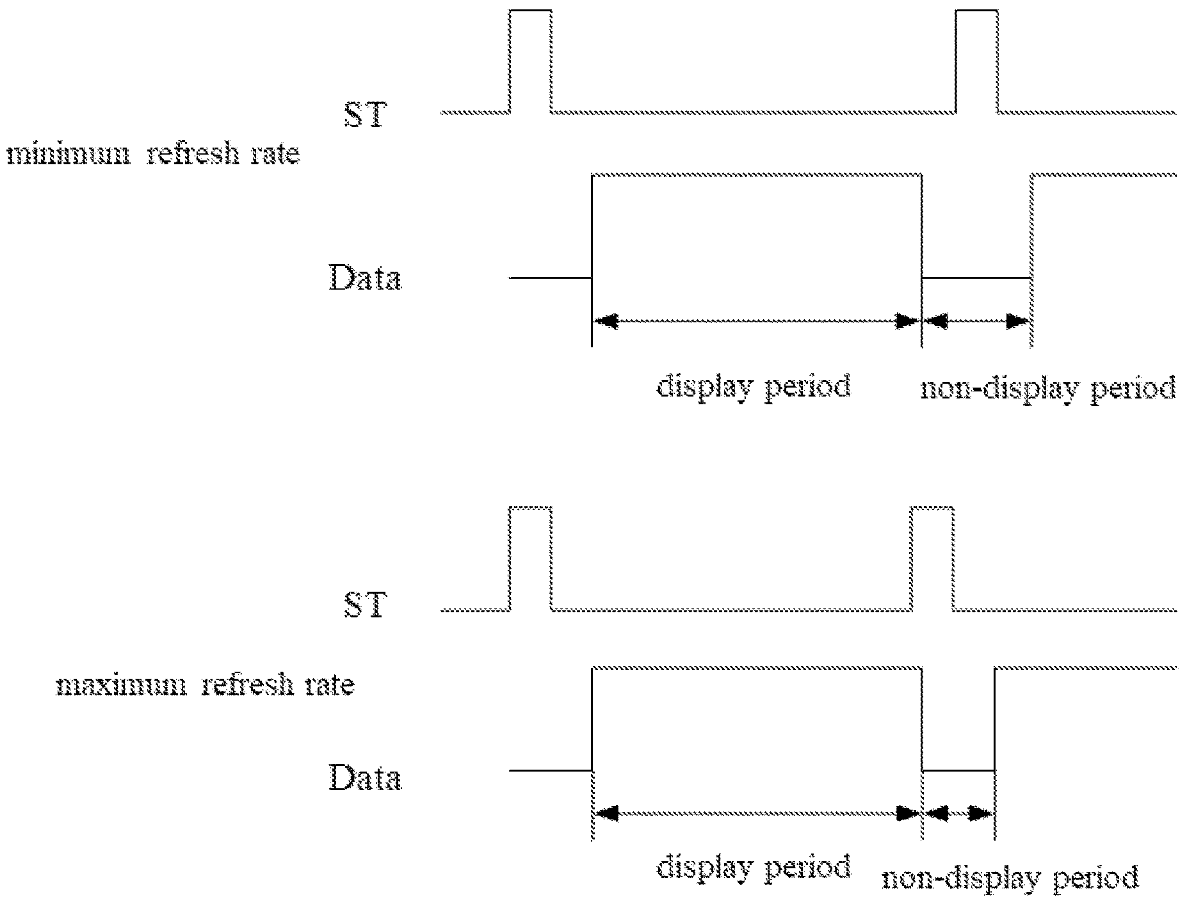
FIG. 5 is a driving timing diagram of the display panel under the minimum refresh rate and the maximum refresh rate in current technology.

In view of increase in the FreeSync value caused by electrical leakage of the display devices, the inventor conducted an in-depth discussion and reached following conclusions. Referring to FIG. 5, FIG. 5 is a driving timing diagram of the display panel under the minimum refresh rate and the maximum refresh rate in current technology. The upper part of FIG. 5 is a driving timing diagram under the minimum refresh rate, and the lower part of FIG. 5 is a driving timing diagram under the maximum refresh rate. In one frame time, a start signal ST changes from the low level to the high level, and the data signal Data starts to be output. Wherein, a frequency of the start signal ST is related to a refresh rate set by the display panel. The data signal Data includes a display period (also called H-active period) and a non-display period (also called H-blanking period). The display period and the non-display period alternate in turn. The display period displays an effective data signal, and the non-display period performs signal processing. The display panel is charged during the display period and leaks electricity during the non-display period. In a FreeSync mode, display periods under the minimum refresh rate and the maximum refresh rate are same, but a non-display period under the maximum refresh rate is shorter than a non-display period under the minimum refresh rate. Therefore, electrical leakage under the maximum refresh rate is less than electrical leakage under the minimum refresh rate, thereby causing brightness under the maximum refresh rate is higher than brightness under the minimum refresh rate. Therefore, according to the formula of FreeSync=$(L_{Fmax}-L_{Fmin})/(Fmax-Fmin)$, a calculated FreeSync value is larger.

In the first embodiment, a first clock signal CK1 and a second clock signal CK2 are adjusted, a first data signal Data1 and a second data signal Data2 are not adjusted, and a first data control signal TP1 and a second data control signal TP2 are not adjusted. Specifically, a pulse width W1 of the first clock signal is increased based on an original pulse width W to increase a first pixel charging time t1, and a pulse width W2 of the second clock signal is reduced based on the original pulse width W to reduce a second pixel charging time t2. A brightness of the display panel is determined by the brightness of the data signal Data in the display period and the non-display period. In the non-display period, since the electrical leakage under the minimum refresh rate is more than the electrical leakage under the maximum refresh rate, the brightness of the data signal Data is lower when it is under the minimum refresh rate. Therefore, by increasing the pixel charging time under the minimum refresh rate and reducing the pixel charging time under the maximum refresh rate, the embodiment can allow the brightness under the minimum refresh rate to be higher than the brightness under the maximum refresh rate in the display period, so a brightness difference between the minimum refresh rate and the maximum refresh rate caused by the electrical leakage in the non-display period can be offset. Therefore, the difference between the maximum refresh rate and the minimum refresh rate can be reduced, thereby reducing the standard parameter value and allowing the standard parameter value to be as close to the preset condition as possible.

It can be understood that the present disclosure may adjust only one of the first clock signal CK1 or the second clock signal CK2 to realize the technical effect of the present disclosure.

Figure 6A:
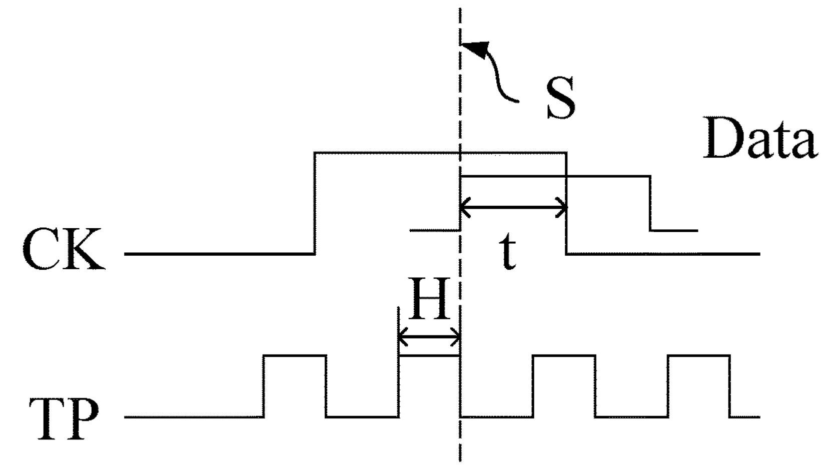
FIG. 6(*a*) is a driving timing diagram of the display panel before adjusting according to a second embodiment of the present disclosure, FIG. 6(*b*) is a driving timing diagram of the display panel after adjusting under the minimum refresh rate according to the second embodiment of the present disclosure, and FIG. 6(*c*) is a driving timing diagram of the display panel after adjusting under the maximum refresh rate according to the second embodiment of the present disclosure.
Figure 6B:
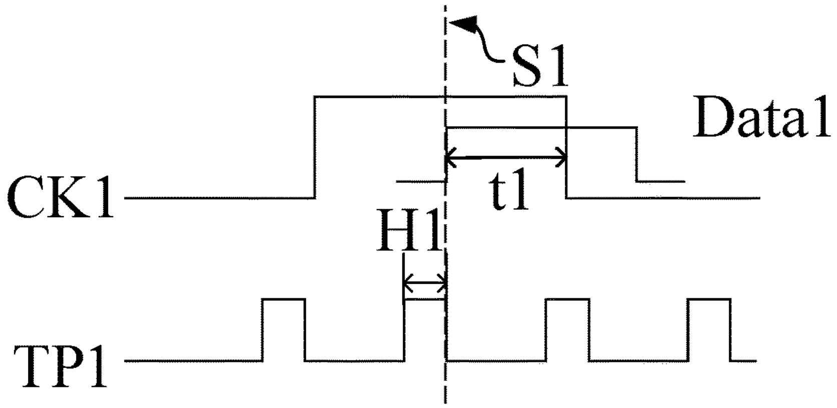
Figure 6C:
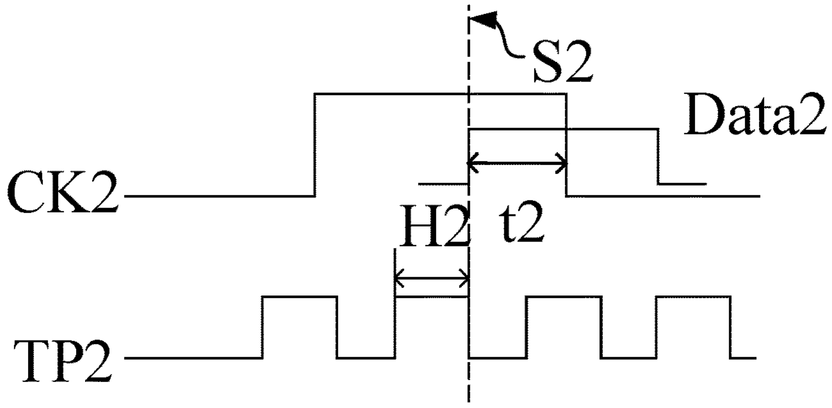

Referring to FIGS. 6(*a*) and 6(*b*), FIG. 6(*a*) is a driving timing diagram of the display panel before adjusting according to a second embodiment of the present disclosure, and FIG. 6(*b*) is a driving timing diagram of the display panel after adjusting under the minimum refresh rate according to the second embodiment of the present disclosure. In an embodiment, the step of increasing the pixel charging time under the minimum refresh rate includes: obtaining a data signal, and bringing forward a pulse start time of the data signal under the minimum refresh rate according to the data signal. Referring to FIGS. 6(*a*) and 6(*c*), FIG. 6(*c*) is a driving timing diagram of the display panel after adjusting under the maximum refresh rate according to the second embodiment of the present disclosure. The step of reducing the pixel charging time under the maximum refresh rate includes: obtaining the data signal, and delaying the pulse start time of the data signal under the maximum refresh rate according to the data signal. To be more specific, the step of bringing forward the pulse start time of the data signal under the minimum refresh rate includes: obtaining a data control signal, and reducing a pulse width of the data control signal under the minimum refresh rate according to the data control signal. The step of delaying the pulse start time of the data signal under the maximum refresh rate includes: obtaining the data control signal, and increasing the pulse width of the data control signal under the maximum refresh rate according to the data control signal.

In the second embodiment, the first clock signal CK1 and the second clock signal CK2 are not adjusted, and the first data signal Data1 and the second data signal Data2 are adjusted by adjusting the first data control signal TP1 and the second data control signal TP2. Specifically, a pulse width H1 of the first data control signal is reduced based on an original pulse width H of the data control signal, and a pulse start time S1 of the data signal under the minimum refresh rate is brought forward based on an original pulse start time S of the data signal to increase the first pixel charging time t1. A pulse width H2 of the second data control signal is increased based on the original pulse width H of the data control signal, and a pulse start time S2 of the data signal under the maximum refresh rate is delayed based on the original pulse start time S of the data signal to reduce the second pixel charging time t2. Same as the first embodiment, by increasing the pixel charging time under the minimum refresh rate and reducing the pixel charging time under the maximum refresh rate, this embodiment can allow the brightness under the minimum refresh rate to be higher than the brightness under the maximum refresh rate in the display period, so the brightness difference between the minimum refresh rate and the maximum refresh rate caused by the electrical leakage in the non-display period can be offset. Therefore, the difference between the maximum refresh rate and the minimum refresh rate can be reduced, thereby reducing the standard parameter value and allowing the standard parameter value to be as close to the preset condition as possible.

It can be understood that the present disclosure may adjust only one of the first data control signal TP1 or the second data control signal TP2 to realize the technical effect of the present disclosure.

Figure 7A:
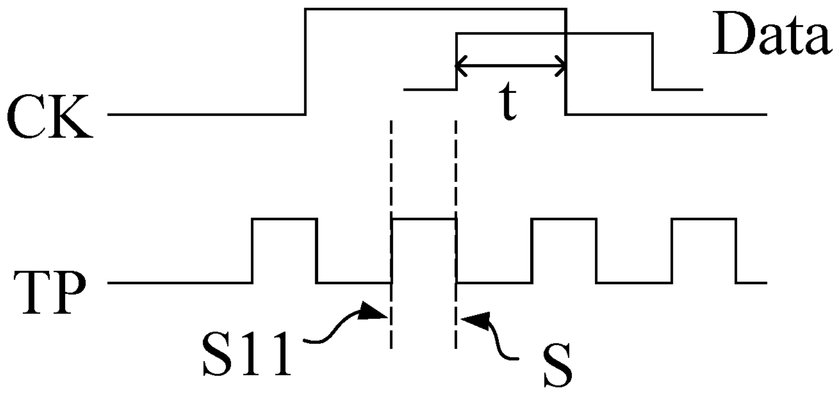
FIG. 7(*a*) is a driving timing diagram of the display panel before adjusting according to a third embodiment of the present disclosure, FIG. 7(*b*) is a driving timing diagram of the display panel after adjusting under the minimum refresh rate according to the third embodiment of the present disclosure, and FIG. 7(*c*) is a driving timing diagram of the display panel after adjusting under the maximum refresh rate according to the third embodiment of the present disclosure.
Figure 7B:
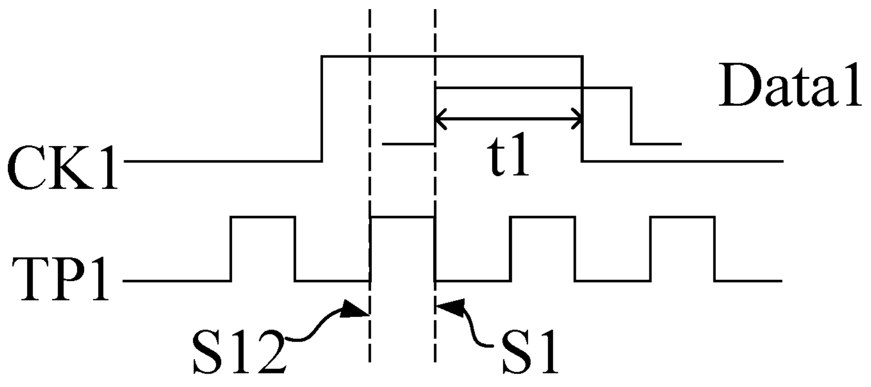
Figure 7C:
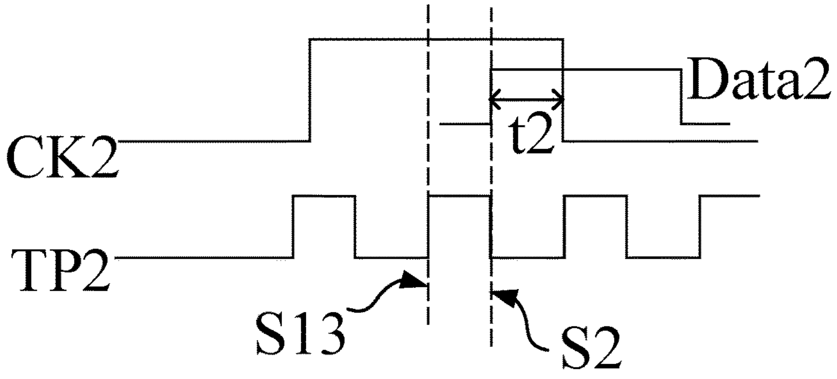

Referring to FIGS. 7(*a*) and 7(*b*), FIG. 7(*a*) is a driving timing diagram of the display panel before adjusting according to a third embodiment of the present disclosure, and FIG. 7(*b*) is a driving timing diagram of the display panel after adjusting under the minimum refresh rate according to the third embodiment of the present disclosure. The third embodiment of the present disclosure is roughly the same as the second embodiment, and differences are the step of bringing forward the pulse start time of the data signal and the step of delaying the pulse start time of the data signal. In the third embodiment, the step of bringing forward the pulse start time of the data signal includes: obtaining the data control signal and bringing forward a pulse start time of the data control signal under the minimum refresh rate according to the data control signal. Referring to FIGS. 7(*a*) and 7(*c*), FIG. 7(*a*) is the driving timing diagram of the display panel before adjusting according to the third embodiment of the present disclosure, and FIG. 7(*c*) is a driving timing diagram of the display panel after adjusting under the maximum refresh rate according to the third embodiment of the present disclosure. The step of delaying the pulse start time of the data signal includes: obtaining the data control signal and delaying the pulse start time of the data control signal under the maximum refresh rate according to the data control signal.

In the third embodiment, the first clock signal CK1 and the second clock signal CK2 are not adjusted, and the first data signal Data1 and the second data signal Data2 are adjusted by adjusting the first data control signal TP1 and the second data control signal TP2. Specifically, a pulse start time S12 of the first data control signal TP1 is brought forward based on an original pulse start time S11 of the data control signal, so the pulse start time S1 of the data signal under the minimum refresh rate is brought forward to increase the first pixel charging time t1. A pulse start time S13 of the second data control signal TP2 is delayed based on the original pulse start time S11 of the data control signal, so the pulse start time S2 of the data signal under the maximum refresh rate is delayed to reduce the second pixel charging time t2. Same as the first embodiment, by increasing the pixel charging time under the minimum refresh rate and reducing the pixel charging time under the maximum refresh rate, this embodiment can allow the brightness under the minimum refresh rate to be higher than the brightness under the maximum refresh rate in the display period, so the brightness difference between the minimum refresh rate and the maximum refresh rate caused by the electrical leakage in the non-display period can be offset. Therefore, the difference between the maximum refresh rate and the minimum refresh rate can be reduced, thereby reducing the standard parameter value and allowing the standard parameter value to be as close to the preset condition as possible.

Figure 8A:
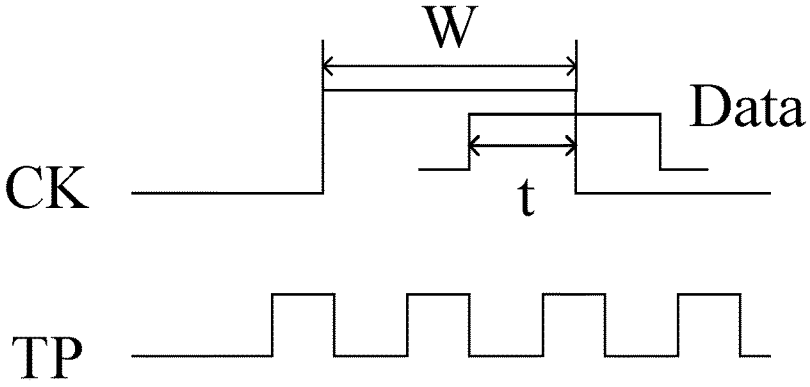
FIG. 8(*a*) is a driving timing diagram of the display panel before adjusting according to a fourth embodiment of the present disclosure, FIG. 8(*b*) is a driving timing diagram of the display panel after adjusting under the minimum refresh rate according to the fourth embodiment of the present disclosure, and FIG. 8(*c*) is a driving timing diagram of the display panel after adjusting under the maximum refresh rate according to the fourth embodiment of the present disclosure.
Figure 8B:
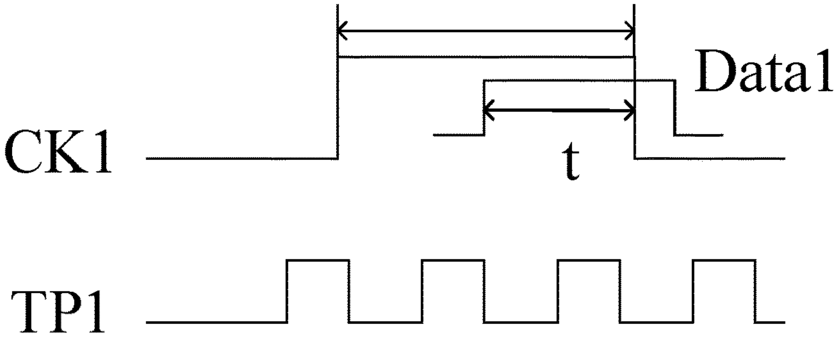
Figure 8C:
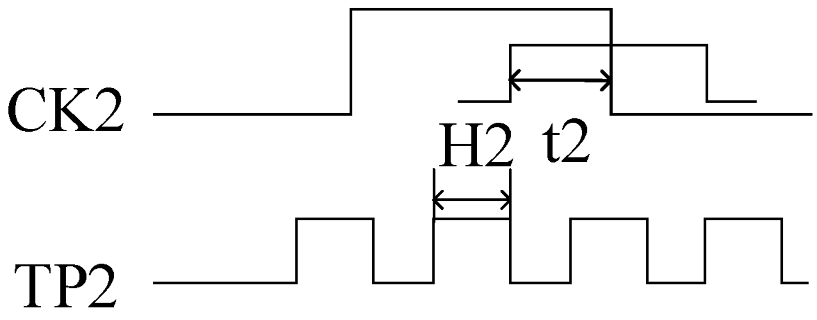

Referring to FIGS. 8(*a*) to 8(*c*), FIG. 8(*a*) is a driving timing diagram of the display panel before adjusting according to a fourth embodiment of the present disclosure, FIG. 8(*b*) is a driving timing diagram of the display panel after adjusting under the minimum refresh rate according to the fourth embodiment of the present disclosure, and FIG. 8(*c*) is a driving timing diagram of the display panel after adjusting under the maximum refresh rate according to the fourth embodiment of the present disclosure. The driving timing diagram of the display panel after adjusting under the minimum refresh rate in FIG. 8(*b*) is same as that in the first embodiment, and the driving timing diagram of the display panel after adjusting under the maximum refresh rate in FIG. 8(*c*) is same as that in the second embodiment, so a detailed description is omitted here. By combining the first embodiment and the second embodiment, the fourth embodiment can increase the first pixel charging time t1 by increasing the pulse width W1 of the first clock signal, and can reduce the second pixel charging time t2 by reducing the pulse width H1 of the first data control signal.

In other embodiments of the present disclosure, the first embodiment to the fourth embodiment may also be combined by other ways to realize the objective of the present disclosure. Further, they are also within the scope of the present disclosure, and will not be listed here.

Figure 9:
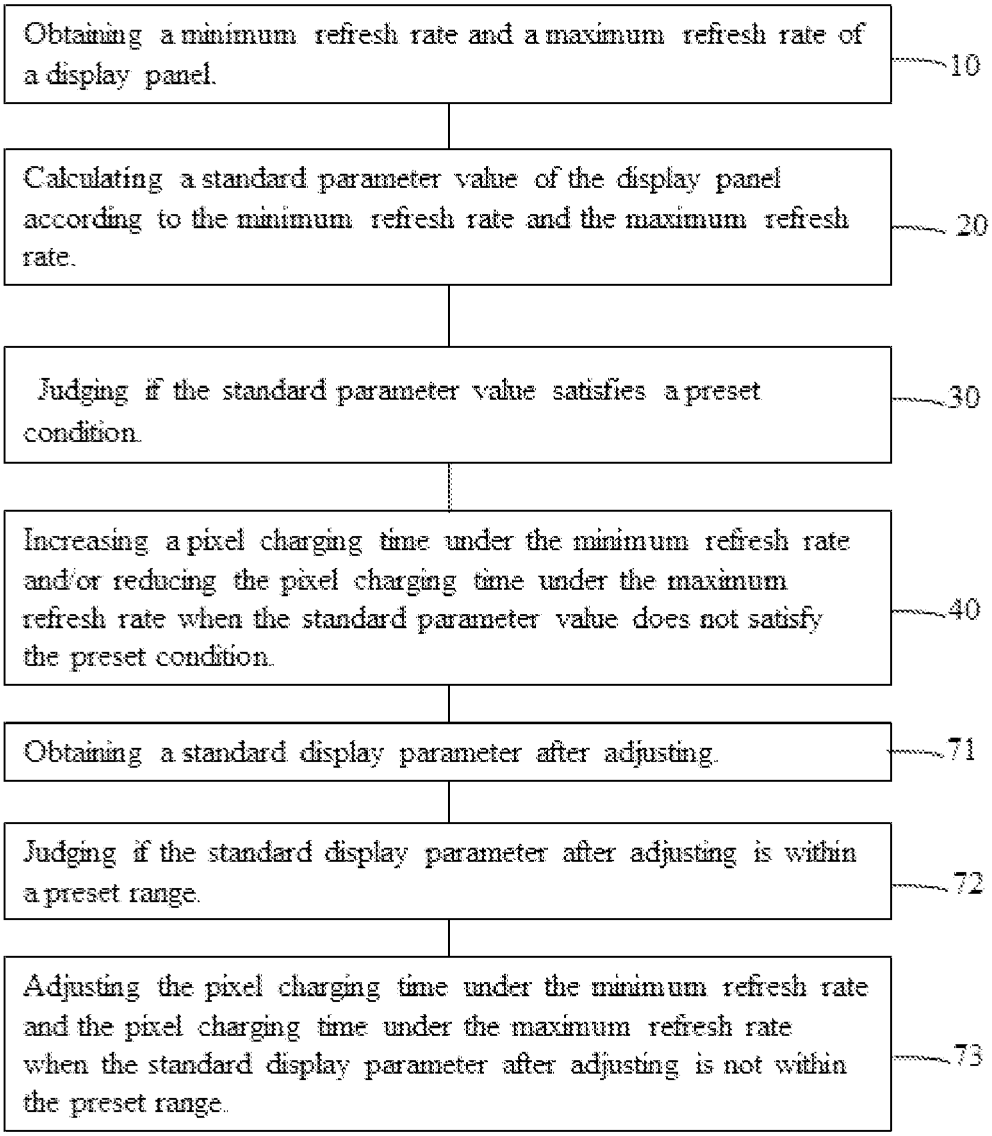
FIG. 9 is a flowchart of the adjusting method of the display panel according to a fifth embodiment of the present disclosure.

It should be noted that in the present disclosure, adjustment of the clock signal, the data control signal, and the data signal needs to take into account both a display taste and the standard parameter value. If a charging time is too short, it is easy to cause displayed pictures to be rough, and if the charging time is too long, it is easy to occur crosstalk. Referring to FIG. 9, FIG. 9 is a flowchart of the adjusting method of the display panel according to a fifth embodiment of the present disclosure. In the adjusting method of the display panel provided by the fifth embodiment, after the step 40 of increasing the pixel charging time under the minimum refresh rate and/or reducing the pixel charging time under the maximum refresh rate when the standard parameter value does not satisfy the preset condition, the adjusting method further includes following steps.

Step 71: obtaining a standard display parameter after adjusting.

In the step 71, the standard display parameter may be a parameter used to judge the display taste. In an embodiment, the standard display parameter may a picture roughness parameter. For example, the picture roughness parameter is set to range from 1 to 10, and the step 71 is specifically: obtaining the picture roughness parameter after adjusting.

In another embodiment, the standard display parameter may be a parameter representing a situation of image crosstalk, such as a brightness difference of displayed pictures, and the parameter may be set to range from 0 to 100%. Then the step 71 is specifically: obtaining the brightness difference of displayed pictures after adjusting.

Step 72: judging if the standard display parameter after adjusting is within a preset range.

In the step 72, in an embodiment, the standard display parameter is the picture roughness parameter, and the preset range is from 5 to 6. Then the step 72 is specifically: judging if the picture roughness parameter after adjusting is within a range from 5 to 6. When the picture roughness parameter is within the range from 5 to 6, the picture roughness parameter after adjusting is judged to be within the preset range, and if no, the picture roughness parameter after adjusting is judged not to be within the preset range.

In another embodiment, the standard display parameter is the brightness difference of displayed pictures, and the preset range is from 40% to 60%. Then the step 72 is specifically: judging if the brightness difference of displayed pictures after adjusting is within a range from 40% to 60%. When the brightness difference of displayed pictures is within the range from 40% to 60%, the brightness difference of displayed pictures after adjusting is judged to be within the preset range, and if no, the brightness difference of displayed pictures after adjusting is judged not to be within the preset range.

Step 73: adjusting the pixel charging time under the minimum refresh rate and the pixel charging time under the maximum refresh rate when the standard display parameter after adjusting is not within the preset range.

In the step 73, when the standard display parameter after adjusting is judged not to be within the preset range, the pixel charging time under the minimum refresh rate and the pixel charging time under the maximum refresh rate are adjusted again until the standard parameter value satisfies the preset condition and the standard display parameter is within the preset range.

The adjusting method of the display panel in the fifth embodiment can balance the display taste and the standard parameter value.

Figure 10:
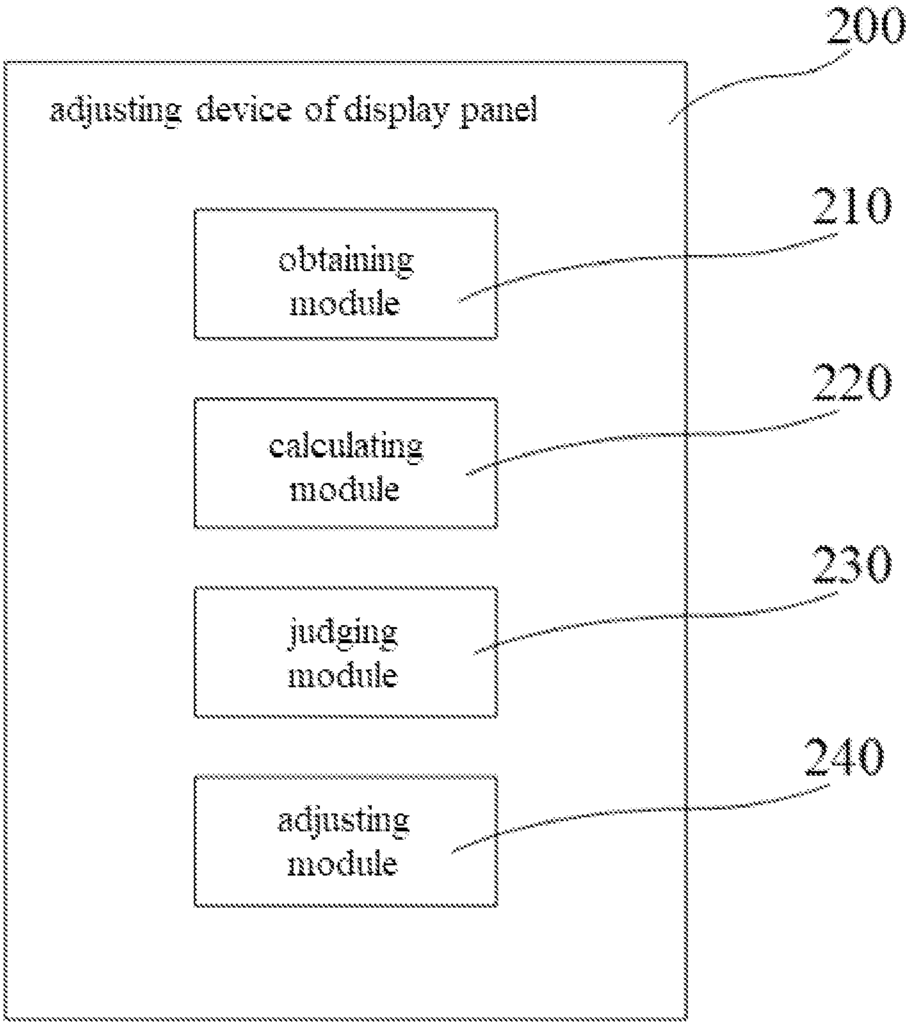
FIG. 10 is a schematic structural diagram of an adjusting device of the display panel according to a sixth embodiment of the present disclosure.

Referring to FIG. 10, FIG. 10 is a schematic structural diagram of an adjusting device 200 of the display panel according to a sixth embodiment of the present disclosure. The adjusting device 200 of the display panel is used to adjust the display panel.

The sixth embodiment of the present disclosure further provides the adjusting device 200 of the display panel, which includes:

- an obtaining module 210 configured to obtain the minimum refresh rate and the maximum refresh rate of the display panel;
- a calculating module 220 configured to calculate the standard parameter value of the display panel according to the minimum refresh rate and the maximum refresh rate;
- a judging module 230 configured to judge if the standard parameter value satisfies the preset condition; and
- an adjusting module 240 configured to increase the pixel charging time under the minimum refresh rate and/or reduce the pixel charging time under the maximum refresh rate when the standard parameter value does not satisfy the preset condition.

Specifically, the obtaining module 210 is configured to obtain the minimum refresh rate and the maximum refresh rate of the display panel that are stored in a memory in advance, and the obtaining module 210 may also be connected to a measure device for measuring the minimum refresh rate and the maximum refresh rate of the display panel to obtain the minimum refresh rate and the maximum refresh rate of the display panel from the measure device. The obtaining module 210 is further configured to obtain the first brightness value according to the minimum refresh rate and obtain the second brightness value according to the maximum refresh rate. The obtaining module 210 is further configured to obtain the standard display parameter after adjusting.

The calculating module 220 is configured to calculate the standard parameter value of the display panel according to the minimum refresh rate and the maximum refresh rate. Specifically, the calculating module 220 is configured to subtract the first brightness value from the second brightness value to obtain the first target parameter, subtract the minimum refresh rate from the maximum refresh rate to obtain the second target parameter, and divide the first target parameter by the second target parameter to obtain the standard parameter value. The calculating module 220 is configured to calculate the standard parameter value under the grayscale of 127 and the grayscale of 255.

The judging module 230 is configured to judge if the standard parameter value satisfies the preset condition. Specifically, If the standard parameter value under the grayscale of 127 is less than or equal to 0.04 and the standard parameter value under the grayscale of 255 is less than or equal to 0.03, the judging module 230 is configured to judge the standard parameter value satisfies the preset condition, and if no, the judging module 230 is configured to judge the standard parameter value does not satisfy the preset condition. The judging module 230 is further configured to judge if the standard display parameter is within the preset range.

The adjusting module 240 is configured to adjust the pixel charging time under the minimum refresh rate and/or the pixel charging time under the maximum refresh rate when the standard parameter value is judged not to satisfy the preset condition to allow the standard parameter value to satisfy the preset condition. Specifically, the adjusting module 240 may be configured to execute one or more of following functions:

obtaining the clock signal, and increasing the pulse width of the clock signal under the minimum refresh rate and/or reducing the pulse width of the clock signal under the maximum refresh rate according to the clock signal;

obtaining the data signal, and bringing forward the pulse start time of the data signal under the minimum refresh rate and/or delaying the pulse start time of the data signal under the maximum refresh rate according to the data signal;

obtaining the data control signal, and reducing the pulse width of the data control signal under the minimum refresh rate and/or increasing the pulse width of the data control signal under the maximum refresh rate according to the data control signal; and obtaining a data control signal and bringing forward a pulse start time of the data control signal under the minimum refresh rate according to the data control signal, and/or obtaining the data control signal and delaying the pulse start time of the data control signal under the maximum refresh rate according to the data control signal.

In an embodiment, after increasing the pixel charging time under the minimum refresh rate and/or reducing the pixel charging time under the maximum refresh rate when the standard parameter value does not satisfy the preset condition, the adjusting module 240 is further configured to adjust the pixel charging time under the minimum refresh rate and the pixel charging time under the maximum refresh rate when the standard display parameter is not within the preset range.

By increasing the pixel charging time under the minimum refresh rate and/or reducing the pixel charging time under the maximum refresh rate, the adjusting device of the display panel in the sixth embodiment can allow the brightness under the minimum refresh rate to be higher than the brightness under the maximum refresh rate in the display period, so the brightness difference between the minimum refresh rate and the maximum refresh rate caused by the electrical leakage in the non-display period can be offset. Therefore, the standard parameter value can be reduced, thereby allowing the standard parameter value to be as close to the standard as possible.

The embodiments of the present disclosure are described in detail above. Specific examples are used herein to explain the principles and implementation of the present disclosure. The descriptions of the above embodiments are only used to help understand the present disclosure. Meanwhile, for those skilled in the art, the range of specific implementation and application may be changed according to the ideas of the present disclosure. In summary, the content of the specification should not be construed as causing limitations to the present disclosure.

What is claimed is:

1. An adjusting method of a display panel, comprising following steps:

obtaining a minimum refresh rate and a maximum refresh rate of the display panel;

calculating a standard parameter value of the display panel according to the minimum refresh rate and the maximum refresh rate;

judging if the standard parameter value satisfies a preset condition; and increasing a pixel charging time under the minimum refresh rate or reducing the pixel charging time under the maximum refresh rate when the standard parameter value does not satisfy the preset condition.

2. The adjusting method of the display panel according to claim 1, wherein the step of calculating the standard parameter value according to the minimum refresh rate and the maximum refresh rate comprises following steps:

obtaining a first brightness value according to the minimum refresh rate;

obtaining a second brightness value according to the maximum refresh rate; and calculating the standard parameter value according to the minimum refresh rate, the first brightness value, the maximum refresh rate, and the second brightness value.

3. The adjusting method of the display panel according to claim 2, wherein the step of calculating the standard parameter value according to the minimum refresh rate and the maximum refresh rate comprises following steps:

subtracting the first brightness value from the second brightness value to obtain a first target parameter;

subtracting the minimum refresh rate from the maximum refresh rate to obtain a second target parameter; and dividing the first target parameter by the second target parameter to obtain the standard parameter value.

4. The adjusting method of the display panel according to claim 1, wherein before the step of calculating the standard parameter value of the display panel according to the minimum refresh rate and the maximum refresh rate, the adjusting method further comprises following steps:

adjusting a display grayscale of the display panel to be a grayscale of 127; and adjusting the display grayscale of the display panel to be a grayscale of 255;

the step of calculating the standard parameter value of the display panel according to the minimum refresh rate and the maximum refresh rate comprises following steps:

calculating the standard parameter value under the grayscale of 127; and calculating the standard parameter value under the grayscale of 255.

5. The adjusting method of the display panel according to claim 4, wherein the step of judging if the standard parameter value satisfies the preset condition comprises:

if the standard parameter value under the grayscale of 127 is less than or equal to 0.04 and the standard parameter value under the grayscale of 255 is less than or equal to 0.03, judging the standard parameter value satisfies the preset condition, and if no, judging the standard parameter value does not satisfy the preset condition.

6. The adjusting method of the display panel according to claim 1, wherein the step of increasing the pixel charging time under the minimum refresh rate or reducing the pixel charging time under the maximum refresh rate when the standard parameter value does not satisfy the preset condition comprises:

obtaining a clock signal, and increasing a pulse width of the clock signal under the minimum refresh rate or reducing the pulse width of the clock signal under the maximum refresh rate according to the clock signal.

7. The adjusting method of the display panel according to claim 1, wherein the step of increasing the pixel charging time under the minimum refresh rate or reducing the pixel charging time under the maximum refresh rate when the standard parameter value does not satisfy the preset condition comprises:

obtaining a data signal, and bringing forward a pulse start time of the data signal under the minimum refresh rate or delaying the pulse start time of the data signal under the maximum refresh rate according to the data signal.

8. The adjusting method of the display panel according to claim 7, wherein the step of obtaining the data signal, and bringing forward the pulse start time of the data signal under the minimum refresh rate or delaying the pulse start time of the data signal under the maximum refresh rate according to the data signal comprises:

obtaining a data control signal, and reducing a pulse width of the data control signal under the minimum refresh rate or increasing the pulse width of the data control signal under the maximum refresh rate according to the data control signal.

9. The adjusting method of the display panel according to claim 7, wherein the step of obtaining the data signal, and bringing forward the pulse start time of the data signal under the minimum refresh rate or delaying the pulse start time of the data signal under the maximum refresh rate according to the data signal comprises:

obtaining a data control signal and bringing forward a pulse start time of the data control signal under the minimum refresh rate according to the data control signal, or obtaining the data control signal and delaying the pulse start time of the data control signal under the maximum refresh rate according to the data control signal.

10. The adjusting method of the display panel according to claim 1, wherein after the step of increasing the pixel charging time under the minimum refresh rate or reducing the pixel charging time under the maximum refresh rate when the standard parameter value does not satisfy the preset condition, the adjusting method further comprises:

obtaining a standard display parameter after adjusting;

judging if the standard display parameter is within a preset range; and adjusting the pixel charging time under the minimum refresh rate and the pixel charging time under the maximum refresh rate when the standard display parameter is not within the preset range.

11. An adjusting device of a display panel, comprising:

an obtaining module configured to obtain a minimum refresh rate and a maximum refresh rate of the display panel;

a calculating module configured to calculate a standard parameter value of the display panel according to the minimum refresh rate and the maximum refresh rate;

a judging module configured to judge if the standard parameter value satisfies a preset condition; and an adjusting module configured to increase a pixel charging time under the minimum refresh rate or reduce the pixel charging time under the maximum refresh rate when the standard parameter value does not satisfy the preset condition.

12. The adjusting device of the display panel according to claim 11, wherein the obtaining module is further configured to obtain a first brightness value according to the minimum refresh rate and obtain a second brightness value according to the maximum refresh rate.

13. The adjusting device of the display panel according to claim 11, wherein the obtaining module is further configured to obtain a standard display parameter after adjusting.

14. The adjusting device of the display panel according to claim 12, wherein the calculating module is configured to subtract the first brightness value from the second brightness value to obtain a first target parameter, subtract the minimum refresh rate from the maximum refresh rate to obtain a second target parameter, and divide the first target parameter by the second target parameter to obtain the standard parameter value.

15. The adjusting device of the display panel according to claim 12, wherein the calculating module is configured to calculate the standard parameter value under the grayscale of 127 and the grayscale of 255.

16. The adjusting device of the display panel according to claim 15, wherein the judging module is configured to judge the standard parameter value satisfies the preset condition if the standard parameter value under the grayscale of 127 is less than or equal to 0.04 and the standard parameter value under the grayscale of 255 is less than or equal to 0.03, and if no, judge the standard parameter value does not satisfy the preset condition.

17. The adjusting device of the display panel according to claim 15, wherein the obtaining module is further configured to obtain a standard display parameter after adjusting, and the judging module is further configured to judge if the standard display parameter is within a preset range.

18. The adjusting device of the display panel according to claim 11, wherein the adjusting module is configured to adjust the pixel charging time under the minimum refresh rate or the pixel charging time under the maximum refresh rate when the standard parameter value does not satisfy the preset condition to allow the standard parameter value to satisfy the preset condition.

19. The adjusting device of the display panel according to claim 18, wherein the adjusting module is configured to execute one or more of following functions:

obtaining a clock signal, and increasing a pulse width of the clock signal under the minimum refresh rate or reducing the pulse width of the clock signal under the maximum refresh rate according to the clock signal;

obtaining a data signal, and bringing forward a pulse start time of the data signal under the minimum refresh rate or delaying the pulse start time of the data signal under the maximum refresh rate according to the data signal;

obtaining a data control signal, and reducing a pulse width of the data control signal under the minimum refresh rate or increasing the pulse width of the data control signal under the maximum refresh rate according to the data control signal; and obtaining the data control signal and bringing forward a pulse start time of the data control signal under the minimum refresh rate according to the data control signal, or obtaining the data control signal and delaying the pulse start time of the data control signal under the maximum refresh rate according to the data control signal.

20. The adjusting device of the display panel according to claim 19, wherein the adjusting module is further configured to adjust the pixel charging time under the minimum refresh rate and the pixel charging time under the maximum refresh rate when a standard display parameter is not within a preset range.

* * * * *